United States Patent [19]

Fujiki et al.

[11] Patent Number: 4,571,641

[45] Date of Patent: Feb. 18, 1986

[54] INFORMATION RECORDING DEVICE

[75] Inventors: Makoto Fujiki, Tokyo; Makoto Takayama, Kanagawa, both of Japan

[73] Assignee: Canon Kabushiki Kaisha, Tokyo, Japan

[21] Appl. No.: 743,587

[22] Filed: Jun. 11, 1985

Related U.S. Application Data

[63] Continuation of Ser. No. 620,867, Jun. 15, 1984, Pat. No. 4,549,236, which is a continuation of Ser. No. 335,339, Dec. 21, 1981, Pat. No. 4,480,273.

[30] Foreign Application Priority Data

Jan. 7, 1981 [JP] Japan ................................. 56-1334

[51] Int. Cl.$^4$ ............................................. H04N 5/78
[52] U.S. Cl. ................................... 360/19.1; 358/341
[58] Field of Search .......................... 360/18, 19.1, 22; 358/341, 335

[56] References Cited

U.S. PATENT DOCUMENTS 3,283,085 11/1966 Lemke .................................. 360/19.1
3,482,038 12/1969 Warren ............................... 360/19.1
4,353,098 10/1982 Heinz et al. ..................... 360/19.1 X Primary Examiner—Robert L. Richardson
Attorney, Agent, or Firm—Toren, McGeady, Stanger, Goldberg & Kiel

[57] ABSTRACT

An information recording device by means of which the information signal such as the picture signal, the sound signal and others are recorded on a recording medium and the information reproduced from the recording medium on which the information has been registered and that from other sources is recorded again on the same recording medium selectively either individually or mixed.

9 Claims, 8 Drawing Figures

INFORMATION RECORDING DEVICE

This is a continuation of application Ser. No. 620,867, filed June 15, 1984, now U.S. Pat. No. 4,549,236 which was a continuation of application Ser. No. 335,339, filed Dec. 21, 1981, now U.S. Pat. No. 4,480,273, issued Oct. 30, 1984.

BACKGROUND OF THE INVENTION

1. Field of the Invention

The present invention relates to an information recording device by means of which an information signal such as a picture signal, sound signal and the like are recorded on a recording medium and new information is added to the recording medium on which the initial information has been recorded.

2. Brief Description of the Prior Art

In the present specification, the video tape recorder (VTR) making use of magnetic tape and a magnetic head is used as an example.

In the conventional type VTR using a cassette and a magnetic head, the picture signal is recorded on an inclined track by means of a rotary head, while the control signal and the sound signal are recorded on the two straight tracks at both ends of the magnetic tape. An example of such a helical scanning type cassette VTR is shown in FIG. 1.

In the drawing, the tape has been loaded in the VTR. The apparatus includes a cassette 1, a magnetic tape 2, and rotary magnetic heads 3 and 4 arranged on a rotary head drum. The capstan 9 and the pinch roller 8, feed the tape 2 in the direction of the arrow 10 at a constant speed. In this way, the magnetic tape 2 runs along the circumference of the head drum, whereby along with the rotation of the rotary heads 3 and 4 in the direction of the arrow 11 the inclined track is formed on the magnetic tape 2. The erasing head 5 is provided for erasing the total width of the tape 2, the erasing head 6 is only for erasing the sound track and the recording reproducing head cooperates only with the sound track and the control signal track.

FIG. 2 shows an example of the pattern on the magnetic tape on which the information is recorded by means of the VTR in FIG. 1. There is shown in the drawing, a track 12 for recording the control signal, a track 13 for recording the sound signal and a video track 14 on which the picture signal is recorded by means of the two rotary magnetic heads 3 and 4, whereby the 1-line 1-field video signal is recorded in accordance with a conventional azimuth recording system. Furthermore, the sound signal is recorded by means of the fixed head 7 on the sound track, at a first lateral extremity of the tape, while at the same time, the CTL signal for obtaining the synchronization at the time of reproduction is recorded on the control track 12 at the other lateral extremity.

In the above described conventional system in order to carry out sound post recording, the sound signal recorded on the sound track 13 is erased by means of the erasing head 6, which cooperates exclusively with the sound track, and a new sound signal is recorded by means of the fixed head 7.

On the other hand, in order to lower the quantity of magnetic tape required, to have a compact and light cassette and cooperating apparatus, the width of the recording trace is narrowed and the running speed of the magnetic tape is decreased and the recording density of the picture signal is increased. However, when the running speed of the magnetic tape is decreased substantially, it is difficult to maintain frequency characteristics sufficient for a fixed head sound signal. Under such circumstances a system is considered in which the signal composed of the picture signal and the sound signal is recorded and reproduced by means of the same rotating magnetic head. However, in accordance with this system, the picture signal and the sound signal are recorded composed, so that post recording of the sound signal is impossible.

SUMMARY OF THE INVENTION

It is an object of the present invention to provide an information recording device free from the above shortcomings, more particularly by means of which it is possible to post record the sound on the same recording medium as that on which the picture and the sound have been recorded simultaneously. As described throughout this specification, "post recording" refers to later recording of a additional or new sound signal on the recording medium that was used in previously recording the information signal (e.g., a picture signal and sound signal).

It is another object of the present invention to provide an information recording device in which the track for the post recording is exclusively provided on the above recording medium.

It is another object of the present invention to provide an information recording device by means of which the simultaneously recorded sound signal and the post recorded sound signal can be reproduced selectively or simultaneously.

It is a further object of the present invention to provide an information recording device by means of which the information reproduced from the recording medium and that from other sources are combined and recorded on the same recording medium as that on which the information is reproduced.

Other objects of the present invention will be obvious from the explanation below in accordance with the accompanying drawings.

DESCRIPTION OF PREFERRED EMBODIMENT

Figure 1:
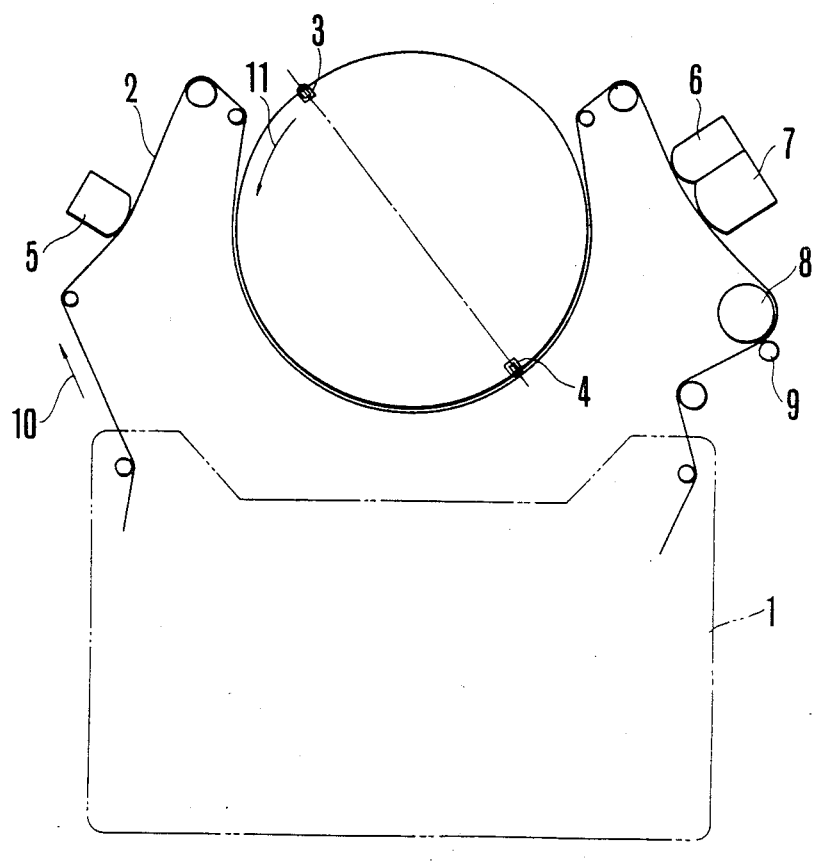
FIG. 1 shows the recording reproducing part as an example of simple conventional VTR.
Figure 2:
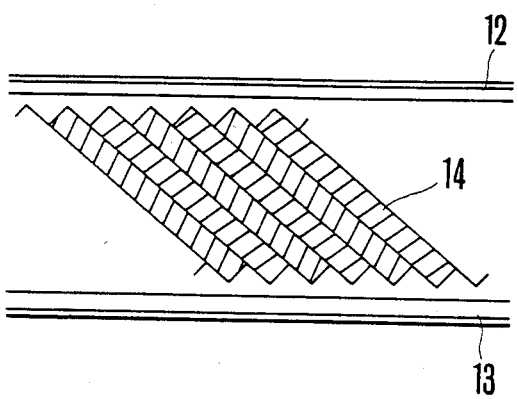
FIG. 2 shows the pattern of the recording track on the magnetic tape with the device shown in FIG. 1.
Figure 3:
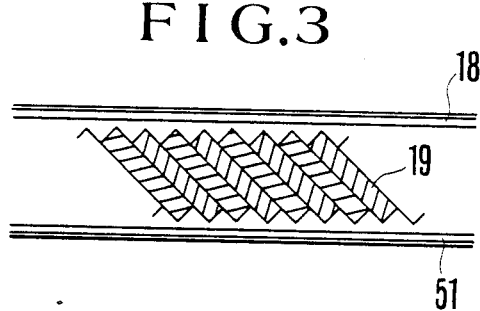
FIG. 3 shows the pattern of the recording track on the magnetic tape with the present embodiment of the information recording device.

FIG. 3 shows an example of the pattern of the magnetic tape of the present embodiment of the magnetic recording reproducing device.

In the drawing, the CTL signal recording track is identified by the reference numeral 18 the inclined track on which the picture and the sound signal is recorded in azimuth by means of the rotary magnetic head is identified by the reference numeral 19. The track 51 is exclusively for recording sound.

Figure 4:
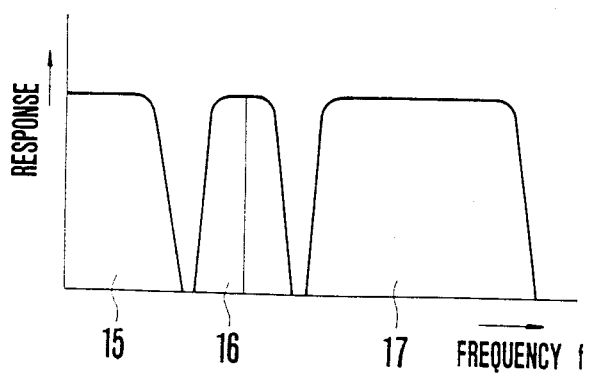
FIG. 4 shows the frequency bands of the recording signals of the present embodiment.

FIG. 4 shows an example of the curve of the frequency band of the picture and the sound signal when the signal composed of the picture signal and the sound signal is recorded by means of the rotary magnetic head. In the drawing, the band 15 for the color signal C is converted in the low band, the band 17 is for the brightness signal Y modified in frequency and the band 16 is for the sound signal AU modified in frequency. The above band definition is only an example, since other combinations are also possible. The above signals C, Y and AU are recorded on the inclined track 19 shown in FIG. 3.

Figure 5:
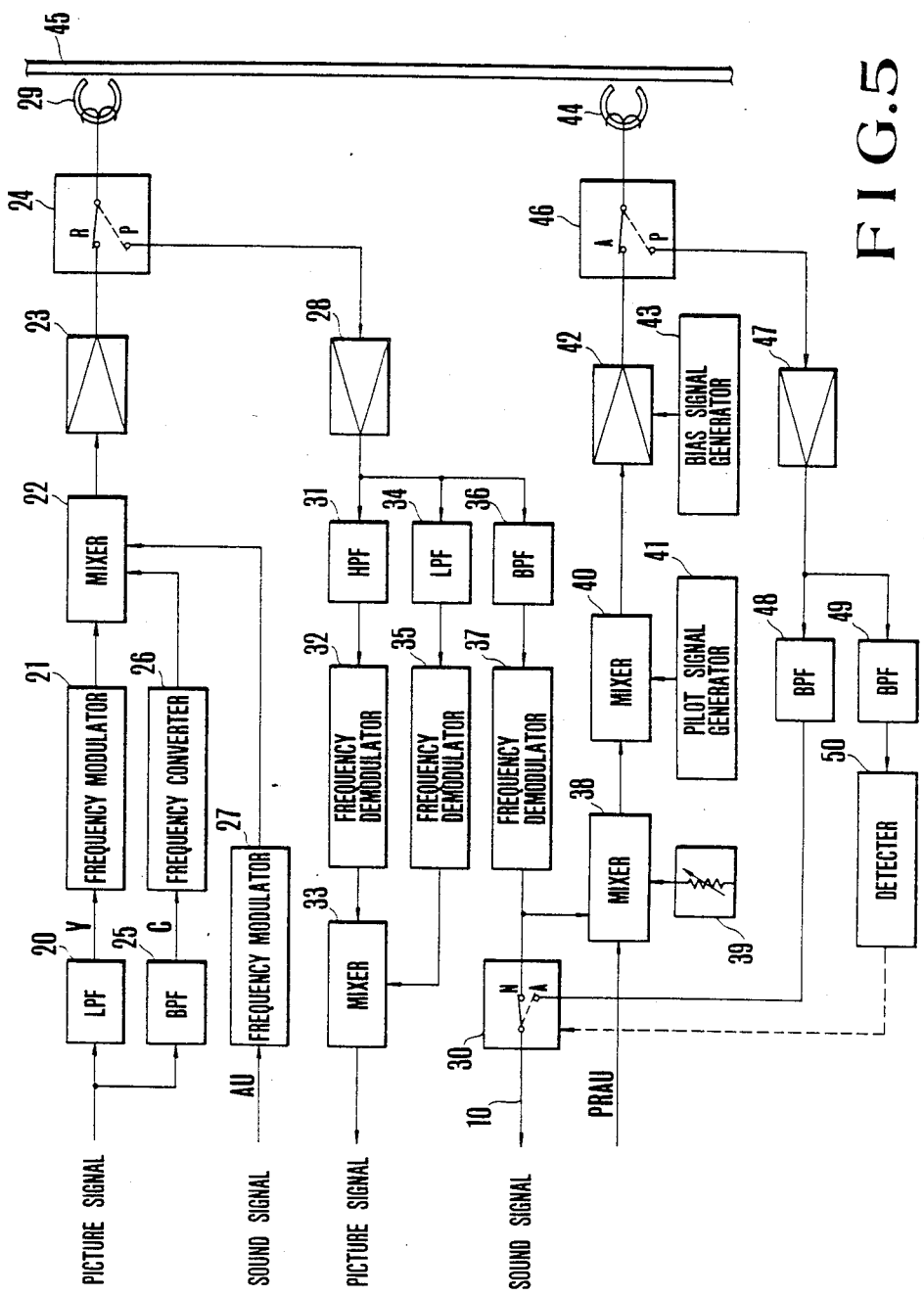
FIG. 5 shows a block diagram of an embodiment of the circuit in the information recording device.

FIG. 5 shows the block diagram of an embodiment of the electric circuit for normal recording and reproducing as well as the sound post recording of the VTR in accordance with the present invention. In the drawing, at the time of normal recording the recording reproducing signal change over analog switch 24 assumes the recording mode (Rec) and the picture signal is input, when by means of the low pass filter (LPF) 20 for picking up the brightness signal the brightness component Y of the picture signal is picked up, modified in frequency by means of the frequency modulator 21 and delivered to the mixer 22. Furthermore, the color signal component of the picture signal is picked up by means of the band pass filter (BPF) 25, converted in the low band frequency by means of the frequency converter for converting the color signal C into the low band and delivered to the mixer 22.

On the other hand, the sound signal is modified in frequency by means of the frequency modulator 27 and delivered to the mixer 22.

As shown in FIG. 4, the frequency band 16 for sound is situated between the frequency band 15 for the color signal converted in the low band and the frequency band 17 for the brightness signal modified in frequency. The output of the mixer 22 is delivered to the recording amplifier 23 and then to the rotary magnetic head 29 through the Rec terminal of the analog switch 24 to be recorded on the inclined track 19 of the magnetic tape 45.

Furthermore, at the time of normal reproduction, the analog switch 24 assumes the reproducing mode (Play) and the post recording signal and the normal reproducing signal change over analog switch 30 is connected to the terminal N. Namely, the picture and the sound signal reproduced by means of the rotary magnetic head 29 are delivered to the reproducing amplifier 28 through the analog switch 24. The output of the reproducing amplifier is delivered to the high pass filter (HPF) 31, LPF 34 and BPF 36. The HPF 31 picks up the brightness signal Y (band 17 in FIG. 4) modifies the frequency and delivers it to the mixer 33 through the frequency demodulator 32. The LPF 34 picks up the color signal C (band 15 in FIG. 4) converted in low frequency, whereby the color signal demodulated by means of the frequency demodulator 35 is delivered to the mixer 33. The output of the mixer 33 becomes the reproduced picture signal. On the other hand, the sound signal (band 16 in FIG. 4), modulated in frequency, is delivered to the frequency demodulator 37 through the BPF 36 and taken out as the sound signal through the analog switch 30.

In the present embodiment of the device, in order to make post recording of the sound possible, a track 51 and a fixed magnetic head 44 are provided exclusively for sound.

Figure 6:
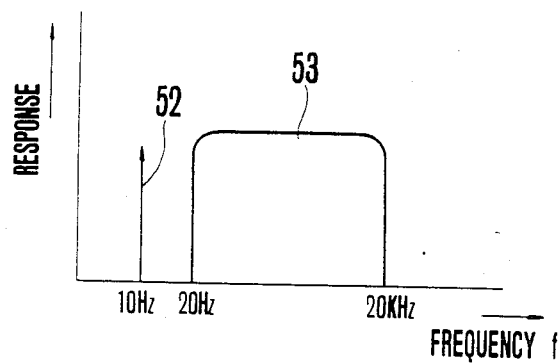
FIG. 6 shows the frequency bands of the pilot signal and the sound signal on a track exclusively for sound in the present embodiment of the device.

At the time of the post recording of the sound, the analog switch 46 is changed over to the terminal A position. The sound signal separated from the signal composed of the picture and the sound signal is delivered to the mixer 38 through the frequency demodulator 37. On the other hand, the post recording sound signal (PRAU) is also delivered to the mixer 38, whereby the mixing ratio of the sound signal (AU) before post recording with that (PRAU) for post recording is varied freely by means of the mixing ratio adjuster 39 belonging to the mixer 38. The output of 38 is delivered to the mixer 40 and added with the pilot signal by means of the pilot signal generator 41. Hereby, as is shown in FIG. 6, the frequency of the pilot signal 52 is chosen 10 Hz lower than the band 53 for sound. Hereby, the band for the pilot signal can be any one which gives no influence to the sound signal. This pilot signal will now be described together with the reproduction of the sound signal from the track 51. The output of the mixer 40 is delivered to the recording amplifier and the bias device 42, in which the bias signal is added by means of the bias signal generator 43. The output of the circuit 42 is recorded on the track 51 (exclusively for sound) on the video tape 45 by means of the fixed magnetic head 44 (exclusively for sound) through the analog switch 46.

When the reproduction mode is assumed after recording on the track 51 (exclusively for sound), the analog switches 24 and 46 are changed over to the terminal P position. The output of the fixed head 44 is connected to the reproducing amplifier 47 through the analog switch 46. The output of the reproducing amplifier 47 is directed to the band pass filter (BPF) 48, which allows the passage of the sound signal (band 53 of FIG. 6). The band pass filter (BPF) 49 picks up the pilot signal component (band 52 in FIG. 6) from the output of the reproducing amplifier 47. The output of the BPF 49 is delivered to the pilot signal detector 50, which changes over the analog switch 30 to the terminal A position at the time of the detection of the pilot signal. The sound signal which has passed the BPF 48 is taken out through the analog switch 30. Namely, when the pilot signal is present the sound signal recorded on the exclusive track 51 is taken out of the sound output line 70. This output sound signal is composed of the post recording sound signal input in the mixer 38 and the sound signal reproduced from the original recording track at the desired mixing ratio. On the other hand, when the pilot signal is absent, the analog switch 30 is changed over to the N position and the separated sound signal reproduced from the picture and sound track is taken out of the sound output line 70.

Figure 7:
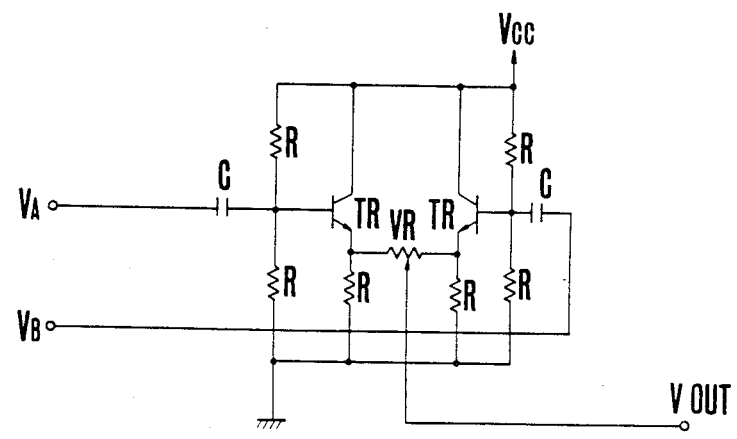
FIG. 7 shows, in greater detail, a portion of the circuit shown in FIG. 5.

The mixer 38 and the adjuster 39 are constructed as is shown in FIG. 7.

In the drawing, a standard power source is identified by the reference numeral Vcc, a condenser C, a resistor R, a transistor TR, the input voltage VA from the frequency modulator 37, the input voltage VB from the post recording sound signal, the output voltage Vout and the variable resistor is identified by the reference numeral VR.

Now let us suppose that the voltage dividing ratio of VR is K:(1−K) and the total resistance of VR is r. Then, the following relations are obtained.

$$Vout = VA\frac{(1-K)}{r} + VB\frac{K}{r}$$

Therefore, $$Vout = (1-K)\frac{VA}{r} + K\frac{VB}{r}$$

Hereby, K can be chosen in such a manner that $0 \leq K \leq 1$. Thus, only VA or only VB can be taken out or VA and VB can be mixed at the proper ratio. Namely, the already recorded sound signal and the post recording sound signal can be recorded on the track exclusively for sound selectively or at the desired mixing ratio.

Figure 8:
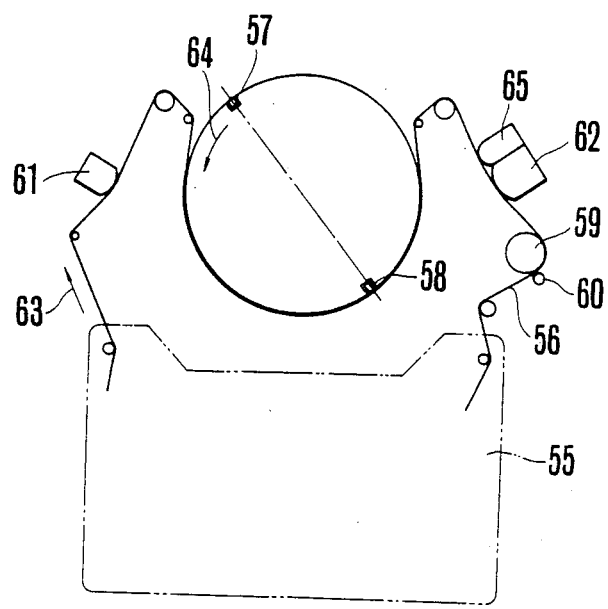
FIG. 8 shows an embodiment of the recording reproducing part of the information recording device of the present invention.

FIG. 8 shows the construction of the recording reproducing part as an embodiment of a simple VTR embodiment in accordance with the present invention. In the drawing, 55 is the cassette for loading the magnetic tape 56, and the rotary magnetic heads 57 and 58 are for recording and reproducing the picture and sound signal. The rotary magnetic heads 57 and 58 rotate in the direction of the arrow 64 at a constant speed. The capstan is identified by the reference numeral 60, while the pinch roller is identified by the reference numeral 59, whereby the tape 56 is under the pressure of the capstan 60 and the pinch roller 59 to be fed in the direction of the arrow 63 along with the constant rotation of the capstan. The erasing head 61 is for erasing the total width of the video tape, the fixed head 62 is for recording and reproducing the CTL signal and the fixed head 65, in accordance with the present invention, is for exclusively recording and reproducing the signal.

Furthermore in order to make the re-post-recording on the sound recording tape possible, it is possible to arrange an erasing head for erasing the track (exclusively for sound) before the fixed head 65 (exclusively for sound) along the running direction of the tape.

In accordance with the invention the system for recording and reproducing the signal composed of the picture signal and the sound signal of the VTR. Post recording of sound is made possible, while a selective means is provided to record the post recording sound signal and the sound signal of the composed signal at the desired ratio when the tape on which the picture and sound signal and the post recording sound signal are recorded is reproduced, which is remarkably effective for editing the sound information on VTR.

Furthermore, in accordance with the present invention, the information reproduced from the recording medium and the information from other new sources can be mixed and post recorded on the same recording medium. In accordance with such construction, new information can be added at the time of the post recording, whereby the already recorded information is not erased. Furthermore, by making the mixing ratio of the reproduced information and that from other sources adjustable the level can be selected in accordance with the wish of the editor. Particularly, in the case of sound information, selecting the mixing ratio, various modes can be expected as the background music or the song is recorded. Thus, the information recording device, in accordance with the present invention, can be applied not only to the present embodiment of VTR but also to the tape recorder or disc recorder for audio purposes and the like.

The present invention is not limited to the above embodiment and can be modified and applied in many ways within the gist of the invention.

What is claimed is:

1. A video tape recorder comprising:
   (a) mixing means for mixing a video signal and a first audio signal to form a composite signal;
   (b) first recording means for recording the composite signal on a first area of a magnetic tape, said first recording means including at least one rotating head;
   (c) first reproducing means for reproducing the composite signal from the first area of the magnetic tape;
   (d) separation means for separating the first audio signal and the video signal from the composite signal reproduced by said first reproducing means;
   (e) second recording means for recording a second audio signal on a second area of the magnetic tape, said second recording means including a fixed head;
   (f) second reproducing means for reproducing the second audio signal from the second area of the magnetic tape; and
   (g) output control means for setting the output mode of the recorder at least to the following two modes:
      a first output mode by which only the video signal separated by said separation means and the first audio signal separated by said separation means are simultaneously output; and
      a second output mode by which only the video signal separated by said separation means and the second audio signal reproduced by said second reproducing means are simultaneously output.

2. A recorder according to claim 1, wherein said output control means includes a wave detection circuit which detects the wave of the second audio signal reproduced by said second reproducing means.

3. A recorder according to claim 1, further comprising moving means for moving the magnetic tape in its longitudinal direction.

4. A recorder according to claim 3, wherein the first area of the magnetic tape and the second area of the magnetic tape are respectively continuous in the longitudinal direction of the magnetic tape.

5. A recorder according to claim 4, wherein the rotating head traces the first area in an oblique direction.

6. A video tape recorder comprising:
   (a) frequency modulation means for frequency modulating a first audio signal;
   (b) mixing means for mixing a video signal and the frequency modulated first audio signal to form a composite signal;
   (c) first recording means for recording the composite signal on a first area of a magnetic tape;
   (d) first recording means for reproducing the composite signal from the first area of the magnetic tape;
   (e) separation means for separating the frequency modulated first audio signal and the video signal from the composite signal reproduced by said first reproducing means;
   (f) demodulation means for frequency demodulating the first audio signal separated by said separation means;

(g) second recording means for recording a second audio signal on a second area of the magnetic tape;

(h) second reproducing means for reproducing the second audio signal from the second area of the magnetic tape and (i) output control means for setting the output mode of the recorder at least to the following two modes:

a first output mode by which only the video signal separated by said separation means and the first audio signal demodulated by said demodulation means are simultaneously output; and a second output mode by which only the video signal separated by said separation means and the second audio signal reproduced by said second reproducing means are simultaneously output.

7. A video tape recorder comprising:

(a) frequency modulation means for frequency modulating a first audio signal;

(b) first recording means for recording the frequency modulated first audio signal and a video signal on a first area of a magnetic tape, said first recording means including at least one rotating head;

(c) reproducing means for reproducing the video signal from the first area of the magnetic tape;

(d) input means for inputting a second audio signal;

(e) adding means for forming a bias-added audio signal by adding a bias signal to an audio signal including the second audio signal; and (f) second recording means for recording the bias-added audio signal on a second area of the magnetic tape, said second recording means being operable when the video signal is reproduced by said reproducing means.

8. A recorder according to claim 7, wherein said reproducing means is able to reproduce the first audio signal and said second recording means is operable when the first audio signal is reproduced by said reproducing means.

9. A video tape recorder comprising:

(a) mixing means for mixing a video signal and a first audio signal to form a composite signal;

(b) first recording means for recording the composite signal on a first area of a magnetic tape, said first recording means including at least one rotating head;

(c) reproducing means for reproducing the composite signal from the first area of the magnetic tape;

(d) input means for inputting a second audio signal; and (e) second recording means for recording an audio signal including the second audio signal on a second area of the mangetic tape, said second recording means being operable when the composite signal is reproduced by said reproducing means.

* * * * *